United States Patent
Ravid (10) Patent No.: US 8,346,685 B1
(45) Date of Patent: Jan. 1, 2013

(54) COMPUTERIZED SYSTEM FOR ENHANCING EXPERT-BASED PROCESSES AND METHODS USEFUL IN CONJUNCTION THEREWITH

(75) Inventor: Yiftach Ravid, Rosh Haayin (IL)

(73) Assignee: Equivio Ltd., Rosh Haayin (IL)

( * ) Notice: Subject to any disclaimer, the term of this patent is extended or adjusted under 35 U.S.C. 154(b) by 914 days.

(21) Appl. No.: 12/428,100

(22) Filed: Apr. 22, 2009

(51) Int. Cl.
*G06F 15/18* (2006.01)

(52) U.S. Cl. ........................................................ 706/12

(58) Field of Classification Search .................... 706/12
See application file for complete search history.

(56) References Cited

U.S. PATENT DOCUMENTS

| | | | |
|---|---|---|---|
| 4,839,853 | A | 6/1989 | Deerwester et al. |
| 6,687,696 | B2 | 2/2004 | Hofmann et al. |
| 6,738,760 | B1 | 5/2004 | Krachman |
| 7,328,216 | B2 | 2/2008 | Hofmann et al. |
| 7,376,635 | B1 | 5/2008 | Porcari et al. |
| 7,558,778 | B2 | 7/2009 | Carus et al. |
| 7,657,522 | B1 | 2/2010 | Puzicha et al. |
| 7,933,859 | B1 | 4/2011 | Puzicha et al. |
| 2002/0007283 | A1* | 1/2002 | Anelli .............................. 705/1 |
| 2003/0120653 | A1 | 6/2003 | Brady et al. |
| 2005/0027664 | A1 | 2/2005 | Johnson et al. |
| 2005/0134935 | A1 | 6/2005 | Schmidtler et al. |
| 2006/0242190 | A1 | 10/2006 | Wnek |
| 2006/0294101 | A1 | 12/2006 | Wnek |
| 2007/0156615 | A1 | 7/2007 | Davar et al. |
| 2008/0086433 | A1 | 4/2008 | Schmidtler et al. |
| 2009/0083200 | A1 | 3/2009 | Pollara et al. |
| 2009/0119343 | A1 | 5/2009 | Jiao et al. |
| 2009/0164416 | A1 | 6/2009 | Guha |
| 2010/0250474 | A1 | 9/2010 | Richards et al. |

FOREIGN PATENT DOCUMENTS

WO    WO 2006/008733 A2    1/2006

OTHER PUBLICATIONS

A. Trice and R. Davis, "Consensus Knowledge Acquisition", AI Memo No. 1183, Dec. 1989, pp. 1-24.*
J. Kittler and K. Messer, "Fusion of Multiple Experts in Multimodal Biometric Personal Identity Verification Systems", IEEE 2002, pp. 3-12.*
S. Liao, "Expert system methodologies and applications—a decade review from 1995 to 2004", Expert Systems with Applications 28 (2005) pp. 93-103.*

(Continued)

*Primary Examiner* — Kakali Chaki
*Assistant Examiner* — Vincent Gonzales
(74) *Attorney, Agent, or Firm* — Oliff & Berridge, PLC (57) ABSTRACT

A computerized system for enhancing expert-based processes, the system comprising a computerized expert based data analyzer receiving input from a plurality of experts by operating a corresponding plurality of expert-based processes on a body of data, the input including a discrepancy set including at least one point of discrepancy regarding which less than all of the plurality of experts agree and an agreement set including at least one point of agreement regarding which all of the plurality of experts agree; and an oracle from which oracle input is received resolving at least the point of discrepancy and not resolving any point of agreement in the agreement set; wherein the computerized analyzer is operative to select and to subsequently actuate for purposes of receiving input regarding the body of data, a subset of better experts from among the plurality of experts based on the oracle input.

29 Claims, 2 Drawing Sheets

OTHER PUBLICATIONS

B. Li et al., "Confidence-based Dynamic Ensemble for Image Annotation and Semantics Discovery", ACM MM '03, Nov. 2-8, 2003, Berkeley, CA, pp. 195-206.*

T. Goncalves and P. Quaresma, "Is linguistic information relevant for the classification of legal texts?", ACM ICAIL '05, Jun. 6-11, 2005, Bologna, Italy, pp. 168-176.*

Rennie, Jason D.M., "Derivation of the F-Measure", MIT, Feb. 19, 2004.

Bassan, B. et al., "Parameter Estimation in Differential Equations, using Random Time Transformations," *Journal of the Italian Statistical Society*, Oct. 13, 2009, pp. 177-199.

"Supervised learning," *Wikipedia*, retrieved Aug. 19, 2009, http://en.wikipedia.org/wiki/Supervised_learning.

Draper, N.R. et al., *Applied Regression Analysis*, Third Edition, Wiley, pp. 236 and 238.

Mendenhall, W. et al., *A Second Course In Regression Analysis*, Seventh Edition, 2012, Prentice-Hall.

*The Sedona Conference Journal*, vol. 8, Fall 2007, pp. 189-223.

"Electronic Discovery Software," *ImageMAKER Discovery Assistant*, retrieved Aug. 9, 2009, http://www.discoveryassistant.com/Nav_Top/Product_Description.asp.

"Multilingual E-Discovery," *BASIS Technology*, retrieved Aug. 9, 2009, http://www.basistech.com/ediscovery/?gclid=CNDZr5v71ZwCFd0B4wodSznYew.

"Electronic Discovery Software," *Bitpipe*, retrieved Aug. 9, 2009, http://www.bitpipe.com/rlist/term/Electronic-Discovery-Software.html.

"Electronic Discovery Product: The Clearwell E-Discovery Platform," *Clearwell*, retrieved Aug. 19, 2009, http://www.clearwellsystems.com/products/index.php.

Peterson, M., "Electronic Discovery Software," retrieved Aug. 9, 2009, http://ezinearticles.com/?Electronic-Discovery-Software&id=222396.

"Autonomy's Products," retrieved Apr. 9, 2009, http://www.autonomy.com/.

Joachims, T., "Transductive Inference for Text Classification Using support Vector Machines," *Proceedings of the 16th International Conference on Machine Learning*, 1999.

Deerwester, S. et al., "Indexing by Latent Semantic Analysis," *Journal of the American Society for Information Science* (1986-1998), Sep. 1990, p. 391, vol. 41, No. 6.

Joachims, T., *Learning to Classify Text Using Support Vector Machines: Methods, Theory and Algorithms*, Feb. 2001, Kluwer Academic Publishers.

"Learning to rank," *Wikipedia*, retrieved Apr. 9, 2012, http://en.wikipedia.org/wiki/Learning_to_rank.

"Costly Review Effort in the Context of Documentation Retention Policy Becomes Streamlined, Automated Review System," *H5 Technologies*, Feb. 2005, retrieved Apr. 9, 2012, http://wayback.archive.org/web/jsp/Interstitial.jsp?seconds=5&date=1108350529000&url=http%3A%2F%2Fwww.h5technologies.com%2Fwhatwedo%2Fexample3.html&target=http%3A%2F%2Fweb.archive.org%2Fweb%2F20050214030849%2Fhttp%3A%2Fwww.h5technologies.com%2Fwhatwedo%2Fexample3.html.

"Rosette for E-Discovery," *Basis Technology*, retrieved Apr. 9, 2012, http://www.basistech.com/e-discovery/?gclid=CNDZr5v71ZwCFd0B4wodSznYew.

"Industry Leading E-Discovery Product: Clearwell E-Discovery Platform," *Clearwell*, retrieved Apr. 9, 2012, http://www.clearwellsystems.com/electronics-discovery-products/.

Jan. 9, 2012 Office Action issued in U.S. Appl. No. 13/161,087.

* cited by examiner

Expert1 assigns a computerized binary (e.g. Good/Bad, relevant/irrelevant) score (e.g. QA or relevance indication) to each item (e.g. manufactured item, digital document, safety-inspected object) in a set of items each of which is associated with a computer-readable ID ~110

Independently, Expert2 assigns Good/Bad score to the same set ~120

Perform a computerized comparison of input received from said plurality of experts thereby to identify points of discrepancy and accordingly, build a discrepancy matrix with cells N11, N12, N21, N22 whose sum is N.
N11 = number of items deemed good e.g. relevant, by both experts. N22 = number of items deemed bad e.g. irrelevant, by both experts. N12, N21 = number of items deemed good by one expert and bad by the other, respectively. ~130

Give Oracle (typically computerized & costly) at least some of (e.g. at least a random sample of) only those documents that experts 1 and 2 disagreed about (e.g. sample/s of the union between, or each of, N12 and N21) and receive oracle input from the oracle resolving at least a point of discrepancy, n1, n2, x1, x2 values being defined as follows:
n1, n2 = size of subsets sampled from N12, N21 respectively and provided to oracle
x1, x2 = number of items from among n1, n2 respectively which oracle deems good ~140

Compute p, r1, q1, r2, q2 ~160

Compute characteristics of the two experts e.g. recall, precision, f-measure (weighted or unweighted), richness, decide which expert is better by comparing characteristics; henceforth use the better expert to make binary determinations on subsequent sets of items; optionally compute richness ~170

FIG. 1

|  |  | Expert1 | | |
|---|---|---|---|---|
|  |  | Relevant (X) | Non-Relevant (Y) | Total |
| Expert2 | Relevant (A) | 130000 | 20000 | 150000 |
| | Non-Relevant (B) | 45000 | 775000 | 820000 |
| | Total | 175000 | 795000 | 970000 |

FIG. 2

|  | Verification | |
|---|---|---|
|  | Sample Size | Actual Relevant |
| Expert2 Relevant, Expert1 Non-Relevant (AY) | 300 | 100 |
| Expert2 Non-Relevant / Expert1 Relevant (BX) | 300 | 180 |

FIG. 3

|  | Precision | Recall | f-measure |
|---|---|---|---|
| Expert1 | 89.54% | 95.11% | 92.24% |
| Expert2 | 90.90% | 82.77% | 86.65% |

FIG. 4

COMPUTERIZED SYSTEM FOR ENHANCING EXPERT-BASED PROCESSES AND METHODS USEFUL IN CONJUNCTION THEREWITH

FIELD OF THE INVENTION

The present invention relates generally to inspection processes having binary output and more particularly to computerized systems performing such processes.

BACKGROUND OF THE INVENTION

Data classification methods using machine learning techniques are described, for example, in published United States Patent Application 20080086433.

The following terms may be construed either in accordance with any definition thereof appearing in the prior art literature or in accordance with the specification, or as follows:

Richness: the proportion of relevant documents in the population of data elements which is to be classified. Here and elsewhere, the word "document" is used merely by way of example and the invention is equally applicable to any other type of item undergoing classification.

Precision: the number of relevant documents retrieved divided by the total number of documents retrieved. Precision is computed as follows:

$$\text{Precision} = \frac{|\{\text{relevant documents}\} \cap \{\text{documents retrieved}\}|}{|\{\text{documents retrieved}\}|}$$

Recall: the number of relevant documents retrieved divided by the total number of existing relevant documents (which should ideally have been retrieved). Recall is computed as follows:

$$\text{Recall} = \frac{|\{\text{relevant documents}\} \cap \{\text{documents retrieved}\}|}{|\{\text{relevant documents}\}|}$$

F-measure: the harmonic mean of precision and recall. The F-measure is an aggregated performance score for the individual precision and recall scores. The F-measure is computed as follows:

$F = 2 \cdot (\text{precision} \cdot \text{recall}) / (\text{precision} + \text{recall}).$ The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide an improved system for performing item inspection having binary output.

There is thus provided, in accordance with at least one embodiment of the present invention, a method for enhancing expert-based processes when receiving input from a plurality of experts operating a corresponding plurality of computerized expert-based processes on a body of data, the data including an agreement set including at least one point of agreement regarding which all of the plurality of experts agree, the method comprising determining a discrepancy set including at least one point of discrepancy regarding which less than all of the plurality of experts agree, the determining including performing a computerized comparison of input received from the plurality of experts thereby to identify points of discrepancy, providing at least a portion of the discrepancy set to an oracle and receiving oracle input from the oracle resolving at least the point of discrepancy; and selecting a subset of better computerized expert-based processes, from among the plurality of computerized expert-based processes, based on the oracle input.

Further in accordance with at least one embodiment of the present invention, the input comprises a quality assurance indication regarding a multiplicity of manufactured items.

Still further in accordance with at least one embodiment of the present invention, the input comprises a determination of relevancy of a multiplicity of disclosed documents to a legal proceeding.

Additionally in accordance with at least one embodiment of the present invention, the input comprises a determination of relevancy of a multiplicity of disclosed documents to a search term entered into a search engine.

Further in accordance with at least one embodiment of the present invention, only the discrepancy set, and not the agreement set, is provided to the oracle.

Also in accordance with at least one embodiment of the present invention, the oracle comprises a computerized process which is more costly than the plurality of experts.

Further in accordance with at least one embodiment of the present invention, the selecting comprises using the oracle input and the input from the plurality of experts to estimate recall of an individual one of the plurality of experts.

Still further in accordance with at least one embodiment of the present invention, the selecting comprises using the oracle input and the input from the plurality of experts to estimate precision of an individual one of the plurality of experts.

Also in accordance with at least one embodiment of the present invention, each of the expert-based processes has a binary output defining a first desired output value and second undesired output values and also comprising using the oracle input and the input from the plurality of experts to estimate richness of the body of data including the proportion of the body of data having the first output value.

Additionally in accordance with at least one embodiment of the present invention, the oracle input resolves less than all of a total number of points of discrepancy in the discrepancy set by randomly sampling a subset of the total number of points of discrepancy.

Also in accordance with at least one embodiment of the present invention, each of the expert-based processes has a binary output defining first and second output values and wherein the discrepancy set includes a first set of points of discrepancy in which first and second experts from among the plurality of experts output the first and second output values respectively and a second set of points of discrepancy in which first and second experts from among the plurality of experts output the second and first output values respectively.

Additionally in accordance with at least one embodiment of the present invention, the portion of the discrepancy set comprises a random sample of each of the first and second sets.

Further in accordance with at least one embodiment of the present invention, the method also comprises receiving input from a plurality of experts operating a corresponding plurality of computerized expert-based processes on a body of data.

Still further in accordance with at least one embodiment of the present invention, the body of data comprises a population of items each associated with a unique computer-readable ID.

Additionally in accordance with at least one embodiment of the present invention, each of the plurality of computerized expert-based processes comprises analyzing an individual item from among the population of items including determining a binary output representing the analyzing; and generating a computerized representation of the binary output and associating the representation with the ID.

Further in accordance with at least one embodiment of the present invention, the method also comprises actuating the subset of better computerized expert-based processes for purposes of receiving input regarding a body of data.

Also provided, in accordance with at least one embodiment of the present invention, is a computer program product, comprising a computer usable medium having a computer readable program code embodied therein, the computer readable program code adapted to be executed to implement a method for enhancing expert-based processes, the method comprising receiving input from a plurality of experts by operating a corresponding plurality of expert-based processes on a body of data, the input including a discrepancy set including at least one point of discrepancy regarding which less than all of the plurality of experts agree and an agreement set including at least one point of agreement regarding which all of the plurality of experts agree, receiving oracle input from an oracle resolving at least the point of discrepancy and not resolving any point of agreement in the agreement set; and selecting, and subsequently actuating for purposes of receiving input regarding the body of data, a subset of better experts from among the plurality of experts based on the oracle input.

Further provided, in accordance with at least one embodiment of the present invention, is a computerized system for enhancing expert-based processes, the system comprising a computerized expert based data analyzer receiving input from a plurality of experts by operating a corresponding plurality of expert-based processes on a body of data, the input including a discrepancy set including at least one point of discrepancy regarding which less than all of the plurality of experts agree and an agreement set including at least one point of agreement regarding which all of the plurality of experts agree, an oracle from which oracle input is received resolving at least the point of discrepancy and not resolving any point of agreement in the agreement set; and wherein the computerized analyzer is operative to select and to subsequently actuate for purposes of receiving input regarding the body of data, a subset of better experts from among the plurality of experts based on the oracle input.

Also provided, in accordance with at least one embodiment of the present invention, is a computer program product, comprising a computer usable medium having a computer readable program code embodied therein, the computer readable program code adapted to be executed to implement a method for enhancing expert-based processes, the method comprising receiving input from a plurality of experts by operating a corresponding plurality of expert-based processes on a body of data, the input including a discrepancy set including at least one point of discrepancy regarding which less than all of the plurality of experts agree and an agreement set including at least one point of agreement regarding which all of the plurality of experts agree; receiving oracle input from an oracle resolving at least the point of discrepancy and not resolving any point of agreement in the agreement set; and selecting, and subsequently actuating for purposes of receiving input regarding the body of data, a subset of better experts from among the plurality of experts based on the oracle input.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display, store and accept information, including computer programs, in accordance with some or all of the teachings of the present invention, such as but not limited to a conventional personal computer processor, workstation or other programmable device or computer or electronic computing device, either general-purpose or specifically constructed, for processing; a display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

Certain embodiments of the present invention are illustrated in the following drawings:

FIG. 1 is a simplified flowchart illustration of a computerized method for comparing experts constructed and operative in accordance with certain embodiments of the present invention.

DETAILED DESCRIPTION OF CERTAIN EMBODIMENTS

FIG. 1 is a simplified flowchart illustration of a computerized method for comparing experts constructed and operative in accordance with certain embodiments of the present invention. The illustrated embodiment pertains to pairwise comparison of experts; if more than 2 experts are used, the method of FIG. 1 can be repeated for each pair of experts or for a subset of the possible pairs of experts, thereby to enable partial or complete ranking of the relative merits of the experts.

The method of FIG. 1 typically comprises some or all of the following steps, suitably ordered e.g. as shown:

In step 110, Expert1 assigns Good/Bad (e.g. relevant/irrelevant) scores to each item (e.g. document) in a set of items.

In step 120, Expert2 assigns Good/Bad scores to the same set.

In step 130, a discrepancy matrix is constructed with cells N11, N12, N21, N22 whose sum is N (total number of items). N11=number of items deemed good e.g. relevant, by both experts. N22=number of items deemed bad e.g. irrelevant, by both experts. N12, N21=number of items deemed good by one expert and bad by the other, respectively.

In step 140, an Oracle (a third expert, typically more trusted but more costly than the first two) is given at least some of (at least a sample of) only those documents that experts 1 and 2 disagreed on (sample of the union between N12 and N21). Define n1, n2, x1, x2 values as follows:

n1, n2=size of subsets sampled from N12, N21 respectively and provided to oracle x1, x2=number of items from among n1, n2 respectively which oracle deems good In step 160, parameters p, r1, r2, q1, q2 are computed, where p is the richness of the set (percentage of good items in the set of N items), r1 and r2 are the theoretical recall rates of the experts; and q1 and q2 are the theoretical false positive rates of the experts (rate of occurrence of events in which bad documents are erroneously designated by the expert as good documents).

Using the following definitions, the following is obtained:

$$precision1 = p*r1/(p*r1+(1-p)*q1)$$

$$precision2 = p*r2/(p*r2+(1-p)*q2)$$

For large N:

$$N11/N = p*r1*r2+(1-p)*q1*q2 \quad (1)$$

$$N12/N = p*r1*(1-r2)+(1-p)*q1*(1-q2) \quad (2)$$

$$N21/N = p*(1-r1)*r2+(1-p)*1-q1)*q2 \quad (3)$$

$$N22/N = p*(141)(1-r2)+(1-p)*(1-q1)*(1-q2) \quad (4)$$

The probability that a document, sampled from N12 and N21 respectively, is good, given that it is judged as good by Expert1 and bad by Expert 2, is $$x1/n1 = p*r1*(1-r2)*N/((p*r1*(1-r2)+(1-p)*q1*(1-q2))*N) = p*r1*(1-r2)*N/N12; \quad (5)$$

and $$x2/n2 = p*r2*(1-r1)*N/((p*r2*(1-r1)+(1-p)*q2*(1-q1))*N) = p*r2*(1-r1)*N/N21 \quad (6)$$

There are 6 equations (one being redundant, one being quadratic) for the five variables.

In step 170, characteristics of the two experts e.g. recall, precision, f-measure (weighted or unweighted) and richness are computed and a determination is made as to which expert is better by comparing the characteristics thereof.

A particular advantage of certain embodiments of FIG. 1 is that since experts are often in agreement much of the time, much effort is spared by focusing the oracle solely on items on which the experts disagree.

One method for performing step 160 is now described in detail, using the following terminology:

| | |
|---|---|
| n11 = | N11/N |
| n21 = | N21/N |
| n12 = | N12/N |
| x1 = | X1/N1 |
| x2 = | X2/N2 |
| m1 = | n21 + n11 |
| m2 = | n12 + n11 |

To obtain p2, solve:

$$(A1*r2+B1)/(C1*r2+D1) = (A2*r2+B2)/(C2*r2+D2)$$

| | |
|---|---|
| A1 = | −x1 * m2 |
| B1 = | x1 * n11 |
| C1 = | −(n11 − m2 * m1)/n12 − x1 |
| D1 = | (n11 − m2 * m1)/n12 + x1 * m1 |
| A2 = | (n11 − m1 * m2)/n21 + x2 * m2 |
| B2 = | −x2 * n11 |
| C2 = | x2 + (n11 − m2 * m1)/n21 |
| D2 = | −x2 * m1 |

The above equation yields the following quadratic equation:
alpha*r2*r2+beta*r2+gamma=0 where:

| | |
|---|---|
| alpha = | A1 * C2 − A2 * C1 |
| beta = | A1 * D2 + B1 * C2 − A2 * D1 − B2 * C1 |
| gamma = | B1 * D2 − B2 * D1 |

Solving for r2 yields two roots; r2 is taken to be the larger of the 2:

root_1=(−beta+SQRT(beta*beta−4*alpha*gamma))/(2*alpha)

root_2=(−beta−SQRT(beta*beta−4*alpha*gamma))/(2*alpha)

r2=Max(root_1, root2) Note that root_1 is always greater then root_2, hence r2=root_1.
r1, q1, q2 and p are now derived from p2, as follows:

| | |
|---|---|
| r1 = | x1 * (n11 − r2 * m2)/( (n11− m2 * m1)/n12 * (1 − r2) − x1 * (r2 − m1)) |
| q1 = | (m2 * r2 − n11)/(r2 − m1) |
| q2 = | (m1 * r1 − n11)/(r1 − m2) |
| p = | (n11 − m2 * m1)/((n11 − m2 * m1) + (r1 − m2) * (r2 − m1)) |

One method for performing step 170 is now described in detail.
Expert1 may be characterized as having the following precision, recall and richness:

Precision=1/(1+(1−$p$)*$q2$/($p$*$r2$))

Recall=$r2$

The unweighted f-measure is 2×precision×recall/(precision+recall)
Expert2 may be characterized as having the following precision, recall and richness:

Precision=1/(1+(1−$p$)*$q1$/($p$*$r1$))

Recall=$r1$

The unweighted f-measure is 2×precision×recall/(precision+recall)

One of the two experts is selected as being better than the other, and used henceforth, e.g. based on one, some or all of the above comparative characteristics.

It is appreciated that the method of FIG. 1 has a wide variety of applications in a wide variety of fields in which items are inspected and a binary output of the inspection process is provided, such as but not limited to medical tests, occupational tests, educational tests, all typically computerized in administration, scoring or both; computerized search engines, fabrication facility inspection processes, and safety inspection processes.

An example application is now described, including a testing strategy used to evaluate a machine learning system, termed herein Learning1, for the automated prioritization of documents and keywords. The testing strategy utilizes a statistical model which generates the efficient point and interval statistical estimates of the precision and recall achieved by Learning1 against the precision and recall achieved by an alternative review, filtering or learning method. In the context of electronic discovery, the testing strategy can be applied to evaluate the efficiency of Learning1 in both the initial filtering stage, known as culling, or to the detailed review stage. Under extant approaches, the culling process is typically conducted using a search engine against an agreed list of keywords, while detailed review is conducted by human beings who read the individual documents.

The testing strategy is based on input from two reviewers, where one of the "reviewers" (experts) is the Learning1 software, and the second "reviewer" is an alternative review method, such as keyword-based culling or standard human review. The objective is to compare the review quality achieved by the competing review methods being tested. The testing strategy is based on a model of conditional independence given a latent variable, under which the assessments of the reviewers are conditionally independent, given the relevance assessment by an "oracle". The oracle is an authority whose determination of the relevance value of a document is considered error-free. As described in more detail below, this oracle is consulted in a sample of documents in which the competing review methods generate discrepant relevance values. This is a parsimonious paradigm that admits the identification of a solution from the available data.

Both reviewers grade each document as relevant or not relevant. The decisions for each document are then matched against the decisions of the alternative review method, creating a 2×2 matrix. In the foregoing discussion, R represents Relevant, and NR represents Not Relevant. In two cells, there is unanimous agreement between the Learning1 software decision and the alternative review method (for simplicity, the example assumes that the alternative method is manual keywords). One cell contains the number of documents that both methods agree are relevant. The other cell contains the number of documents that both methods agree are not relevant.

In the two remaining cells, there is a discrepancy between the decision of the human reviewer and the decision of Learning1. For documents where such a discrepancy exists, an "oracle" is consulted to adjudicate. The oracle is an independent, computerized or human judge whose determination of relevance is considered "true". The oracle is consulted only on a sample of the discrepant documents. Using the oracle's determinations, the estimated precision and recall of the competing review methods are computed, using a suitable statistical model e.g. as follows.

Statistical model: A contingency table five-parameter model may be used in testing of Learning1 vis a vis its alternative. The model is used to compute the estimated precision and recall of the two reviewers. In addition, the model may compute the richness (proportion of relevant documents in the collection).

Relevance. Each of N documents is either R (relevant) or NR (not relevant). The fraction p of relevant documents is a parameter of the model.

Oracle. An oracle OR can decide at a high cost whether a document is R or NR.

Two experts. Each of two experts $E_1$ and $E_2$ assesses each of the N documents and judges whether the document is R or NR.

First-stage data—experts. Let N(1,1) be the number of documents unanimously judged as relevant by the two experts and N(2,2) the number of documents unanimously judged as not relevant by the two experts. Let N(1,2) be the number of documents judged as relevant by expert $E_1$ and not relevant by $E_2$, and N(2,1) be the number of documents judged as relevant by expert $E_2$ and not relevant by $E_1$.

Second-stage data—oracle. A sample of size $n_1$ is randomly chosen from the N(1,2) documents judged R by $E_1$ and NR by $E_2$. A sample of size $n_2$ is randomly chosen from the N(2,1) documents judged R by $E_2$ and NR by $E_1$. These documents are submitted to the oracle OR for assessment.

Out of the $n_1$ observations from N(1,2), $x_1$ are assessed by OR as R. Out of the $n_2$ observations from N(2,1), $x_2$ are assessed by OR as R.

Model assumption 1. If a document is relevant, then expert $E_1$ ($E_2$) will judge the document as relevant with probability $r_1$ ($r_2$) and if the document is not relevant, expert $E_1$ ($E_2$) will judge the document as relevant with probability $q_1$ ($q_2$). These four probabilities complete the list of five parameters of the model: p, $r_1$, $r_2$, $q_1$ and $q_2$.

Model assumption 2. Experts $E_1$ and $E_2$ judge each R or NR document independently.

Interpretation. These assumptions are stringent, essentially stating that R (and, similarly, NR) documents are one uniform pool, equally difficult to judge.

Recall. $r_1$ and $r_2$ are the theoretical recall rates of the experts; $q_1$ and $q_2$ are the theoretical false positive rates of the experts.

Precision. The theoretical global fraction of documents judged to be relevant by expert $E_1$ is $pr_1+(1-p)q_1$. The rate of relevant documents among those judged to be relevant by expert $E_1$ is the theoretical precision $$prec_1 = \frac{pr_1}{pr_1 + (1-p)q_1}$$

of expert $E_1$. The precision $$prec_2 = \frac{pr_2}{pr_2 + (1-p)q_2}$$

of expert $E_2$ follows the same lines.

Note that the parameters of the model can be described in two ways: (p, $r_1$, $r_2$, $q_1$, $q_2$) or (p, $r_1$, $r_2$, $prec_1$, $prec_2$). The former is used herein as it is the most convenient mathematically. The latter terminology is used for presentation of the results.

Working assumption 3. The value of N is so large that in practice, the empirical fractions $$\frac{N(1,1)}{N} ; \frac{N(1,2)}{N}$$
$$\frac{N(2,1)}{N} ; \frac{N(2,2)}{N}$$

are equal to their theoretical counterparts $$pr_1r_2+(1-p)q_1q_2; pr_1(1-r_2)+(1-p)q_1(1-q_2)p(1-r_1)r_2+$$
$$(1-p)(1-q_1)q_2; p(1-r_1)(1-r_2)+(1-p)(1-q_1)(1-q_2)$$

Interpretation. Working assumption 3 provides three deterministic equations (one of the four N(i,j)'s obtained by subtracting from N the sum of the other three) for the five parameters of the model. The other two equations are obtained from the second-stage sampling, as described in the next paragraph. Since the sample sizes $n_1$ and $n_2$ range in practice from high tens to low hundreds, the two additional equations provided by the correct assessment of the oracle OR are stochastic. As a result, the five parameters may be estimated rather than evaluated, and confidence intervals are typically provided for all parameters of interest.

Two additional equations—MLE. The probability that a document is R given that it is judged as R by $E_1$ and NR by $E_2$ is $$Q(1,2) = \frac{pr_1(1-r_2)}{pr_1(1-r_2)+(1-p)q_1(1-q_2)} = \frac{pr(1-r_2)N}{N(1,2)}$$

Accordingly, the probability that a document is R given that it is judged as R by $E_2$ and NR by $E_1$ is $$Q(2,1) = \frac{p(1-r_1)r_2}{p(1-r_1)r_2+(1-p)(1-q_1)q_2} = \frac{p(1-r_1)r_2N}{N(2,1)}$$

the likelihood function. Thus, the probability of the observed second-stage data ($X_1$, $X_2$) is defined below (omitting binomial coefficients):

$$LIK = Q(1,2)^{X_1}(1-Q(1,2))^{n_1-X_1}Q(2,1)^{X_2}(1-Q(2,1))^{n_2-X_2}$$

This probability of obtaining the observed $x_1$ and $x_2$ relevant documents, viewed as a function of the five parameters of the model, is the likelihood function. The common statistical method Maximum Likelihood Estimation (MLE) calls for estimating the parameters by maximizing this function, or, in practice, its logarithm. This is accomplished by equating to zero the corresponding derivatives, termed score function in Statistics, the gradient of the logarithm of the likelihood. In this case it is two-dimensional, the dimension left free by the three deterministic equations. These two additional equations are, plainly, equating (the theoretical) Q(1,2) to (the empirical)

$$\frac{X_1}{n_1} \text{ and } Q(2,1) \text{ to } \frac{X_2}{n_2}.$$

$$\frac{pr_1(1-r_2)}{pr_1(1-r_2)+(1-p)q_1(1-q_2)} = \frac{pr_1(1-r_2)N}{N(1,2)} = \frac{X_1}{n_1}$$
$$\frac{p(1-r_1)r_2}{p(1-r_1)r_2+(1-p)(1-q_1)q_2} = \frac{p(1-r_1)r_2N}{N(2,1)} = \frac{X_2}{n_2}$$

Solving for the parameters: The parameter $r_2$ is considered as a free parameter. The four parameters $r_1$, $q_1$, $q_2$ and p are represented in terms of $r_2$ by the following formulas.

$$r_1 = \frac{\frac{N(1,2)}{N}\frac{X_1}{n_1}r_2}{\frac{N(1,2)}{N}\frac{X_1}{n_1}r_2 + \frac{N(2,1)}{N}\frac{X_2}{n_2}(1-r_2)}$$

$$q_1 = \frac{\frac{N(1,1)+N(1,2)}{N}r_2 - \frac{N(1,1)}{N}}{r_2 - \frac{N(1,1)+N(2,1)}{N}}$$

$$q_2 = \frac{\frac{N(1,1)+N(2,1)}{N}r_1 - \frac{N(1,1)}{N}}{r_1 - \frac{N(1,1)+N(1,2)}{N}}$$

$$p = \frac{\frac{N(1,1)}{N} - \frac{N(1,1)+N(2,1)}{N}\frac{N(1,1)+N(1,2)}{N}}{\frac{N(1,1)}{N} - \frac{N(1,1)+N(2,1)}{N}\frac{N(1,1)+N(1,2)}{N} + \left(r_1 - \frac{N(1,1)+N(1,2)}{N}\right)\left(r_2 - \frac{N(1,1)+N(2,1)}{N}\right)}$$

This leaves one equation in terms of $r_2$ only. This is a quadratic equation with two solutions, only one of which corresponds to a maximum of the likelihood function. All five parameters are now evaluated from the three N(i,j)-type and the two $x_i$-type data.

The simulation-based approach discussed here is known in problems in which it is impractical to derive exact analytical probability models. The simulation may be performed as follows: fix the parameter vector as estimated, fix $n_1$ and $n_2$ and simulate the corresponding two binomial or hyper geometric distributions SIM times (say, SIM=100000). For every simulation run, compute $x_1$ and $x_2$, and with them the parameter vector. Moreover, evaluate each parameter of interest, such as relevance rate, expert-wise recall and precision rates, total recall and precision rates for various decision rules (such as to decide R if and only if $E_1$ and $E_2$ concur on R). Report as 95% confidence interval the central 95% range of the corresponding SIM-size-based empirical distribution.

Figure 2:
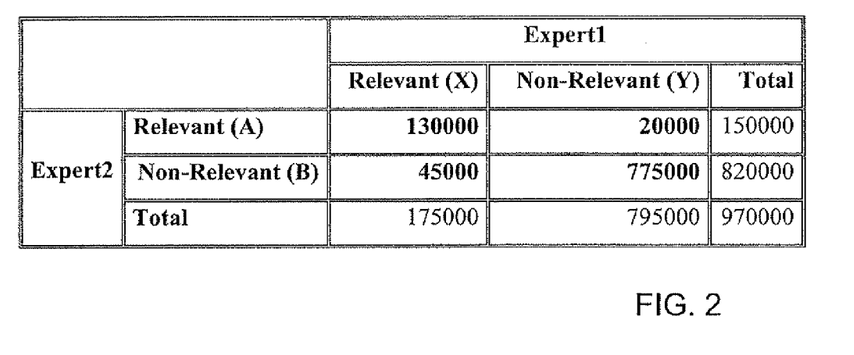
FIGS. 2-4 are tables presenting an example use of a computerized system embodying the method of FIG. 1.
Figure 3:
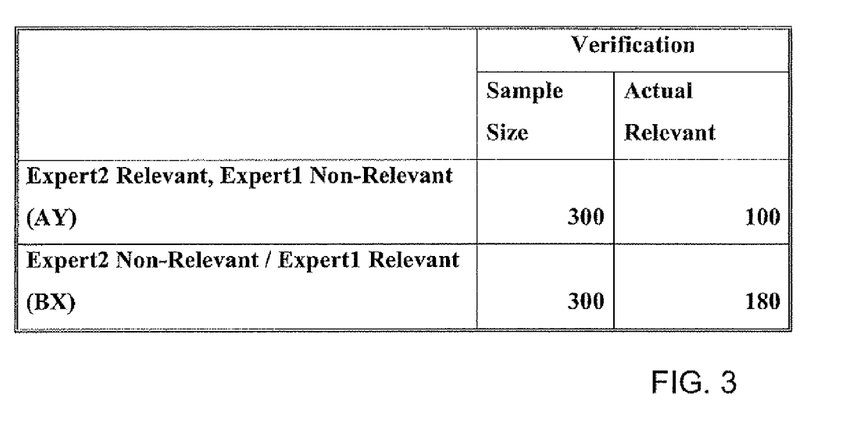

An approximate sampling scheme from binomial BIN(m, q) or hyper geometric distributions is as follows: Sample a Gaussian variable Z with the desired mean 0 and variance $$\frac{\frac{XX}{m} - q}{\sqrt{\frac{XX}{m}\left(1 - \frac{XX}{m}\right)}} \sqrt{m} = Z |$$

for population size M), solve for XX in $$1\left(\text{or } 1 - \frac{m-1}{M-1}\right)|$$

and let X be the integer between 0 and m that is closest to XX.
Numerical Example:

FIG. 2 is a table of binary determinations made by two experts, each of which may comprise a computerized item analysis process having a binary output. FIG. 3 is a table representing sampling of only those items about which the experts of FIG. 2 disagreed i.e. only of the union of the 20,000 items deemed non-relevant by Expert1 and relevant by Expert2 and of the 45,000 items deemed relevant by Expert1 and non-relevant by Expert2.

The computations of step 160 yield:

| | | |
|---|---|---|
| n11 | 0.13402 | |
| n21 | 0.04639 | |
| n12 | 0.02062 | |
| x1 | 0.33333 | |
| x2 | 0.6 | |
| m1 | 0.18041 | |
| m2 | 0.15464 | |
| A1 | −0.0515 | |
| B1 | 0.04467 | |
| C1 | −5.4802 | |
| D1 | 5.20704 | |
| A2 | 2.3803 | |
| B2 | −0.0804 | |
| C2 | 2.88751 | |
| D2 | −0.1082 | |
| alpha | 12.8958 | |
| beta | −12.7 | |
| gamma | 0.41388 | |
| r2 roots | | |
| | root_1 | 0.95111 |
| | root_2 | 0.03374 |

-continued

| | |
|---|---|
| r2 | 0.95111 |
| r1 | 0.82768 |
| q1 | 0.01694 |
| q2 | 0.02274 |
| p | 0.16984 |

Figure 4:
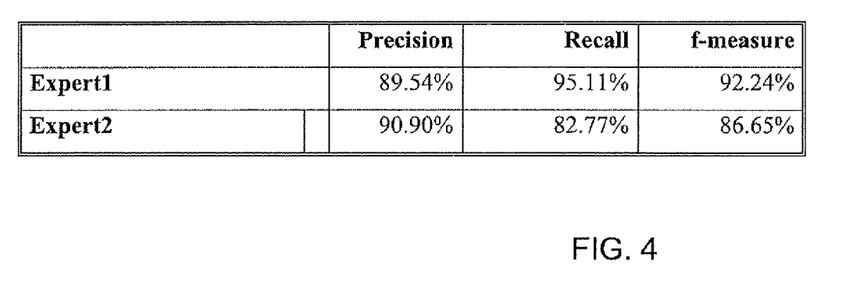

The precision, recall and F-measure of the two experts are as summarized in the table of FIG. 4, and the richness of the set is approximately 0.17. Expert1 would probably be preferred to continue the analysis of the objects under inspection, because its recall considerably exceeds that of Expert2 whereas the two experts are approximately equal in their level of precision.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus, method steps or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery.

The invention claimed is:

1. A method for enhancing expert-based processes when receiving input from a plurality of experts operating a corresponding plurality of computerized expert-based processes on a body of data, said data including an agreement set including at least one point of agreement regarding which all of said plurality of experts agree, the method comprising:
   determining a discrepancy set including at least one point of discrepancy regarding which less than all of the plurality of experts agree, said determining including performing a computerized comparison of input received from said plurality of experts thereby to identify points of discrepancy;
   providing at least a portion of said discrepancy set to an oracle and receiving oracle input from the oracle resolving at least said point of discrepancy; and
   selecting a subset of better computerized expert-based processes, from among said plurality of computerized expert-based processes, based on said oracle input,
   wherein said oracle input resolves less than all of a total number of points of discrepancy in said discrepancy set by randomly sampling a subset of the total number of points of discrepancy,
   and wherein each of the expert-based processes has a binary output defining first and second output values and wherein said discrepancy set includes a first set of points of discrepancy in which first and second experts from among said plurality of experts output the first and second output values respectively and a second set of points of discrepancy in which first and second experts from among said plurality of experts output the second and first output values respectively.

2. A method according to claim 1 wherein said input comprises a quality assurance indication regarding a multiplicity of manufactured items.

3. A method according to claim 1 wherein said input comprises a determination of relevancy of a multiplicity of disclosed documents to a legal proceeding.

4. A method according to claim 1 wherein said input comprises a determination of relevancy of a multiplicity of disclosed documents to a search term entered into a search engine.

5. A method according to claim 1 wherein only said discrepancy set, and not said agreement set, is provided to the oracle.

6. A method according to claim 1 wherein said oracle comprises a computerized process which is more costly than the plurality of experts.

7. A method according to claim 1 wherein said selecting comprises using said oracle input and said input from the plurality of experts to estimate recall of an individual one of said plurality of experts.

8. A method according to claim 1 wherein said selecting comprises using said oracle input and said input from the plurality of experts to estimate precision of an individual one of said plurality of experts.

9. A method according to claim 1 wherein each of the expert-based processes has a binary output defining a first desired output value and a second undesired output value and also comprising using said oracle input and said input from the plurality of experts to estimate richness of the body of data including the proportion of the body of data having said first output value.

10. A method according to claim 1 wherein said portion of said discrepancy set comprises a random sample of each of said first and second sets.

11. A method according to claim 1 and also comprising receiving input from a plurality of experts operating a corresponding plurality of computerized expert-based processes on a body of data.

12. A method according to claim 11 wherein said body of data comprises a population of items each associated with a unique computer-readable ID.

13. A method according to claim 12 wherein each of said plurality of computerized expert-based processes comprises:
   analyzing an individual item from among said population of items including determining a binary output representing said analyzing; and
   generating a computerized representation of said binary output and associating, said representation with said ID.

14. A method according to claim 1 and also comprising actuating said subset of better computerized expert-based processes for purposes of receiving input regarding a body of data.

15. A computer program product, comprising a non-transitory computer usable medium having a computer readable program code embodied therein, said computer readable program code adapted to be executed to implement a method for enhancing expert-based processes, the method comprising:
   receiving input from a plurality of experts by operating a corresponding plurality of expert-based processes on a body of data, the input including a discrepancy set including at least one point of discrepancy regarding which less than all of said plurality of experts agree and an agreement set including at least one point of agreement regarding which all of said plurality of experts agree;
   receiving oracle input from an oracle which receives at least a portion of said discrepancy set and resolving at least said point of discrepancy and not resolving any point of agreement in said agreement set; and
   selecting, and subsequently actuating for purposes of receiving input regarding the body of data, a subset of better experts from among the plurality of experts based on said oracle input,
   wherein said oracle input resolves less than all of a total number of points of discrepancy in said discrepancy set by randomly sampling a subset of the total number of points of discrepancy,
   and wherein each of the expert-based processes has a binary output defining first and second output values and wherein said discrepancy set includes a first set of points of discrepancy in which first and second experts from among said plurality of experts output the first and second output values respectively and a second set of points of discrepancy in which first and second experts from among said plurality of experts output the second and first output values respectively.

16. A computerized system for enhancing expert-based processes, the system comprising:
   a computerized expert based data analyzer residing on a tangible non-transitory computer readable storage medium and operative for receiving input from a plurality of experts by operating a corresponding plurality of expert-based processes on a body of data, the input including a discrepancy set including at least one point of discrepancy regarding which less than all of said plurality of experts agree and an agreement set including at least one point of agreement regarding which all of said plurality of experts agree;

an oracle, receiving at least a portion of said discrepancy set and from which oracle input is received resolving at least said point of discrepancy and not resolving any point of agreement in said agreement set; and wherein said computerized analyzer is operative to select and to subsequently actuate for purposes of receiving input regarding the body of data, a subset of better experts from among the plurality of experts based on said oracle input, wherein said oracle input resolves less than all of a total number of points of discrepancy in said discrepancy set by randomly sampling a subset of the total number of points of discrepancy, and wherein each of the expert-based processes has a binary output defining first and second output values and wherein said discrepancy set includes a first set of points of discrepancy in which first and second experts from among said plurality of experts output the first and second output values respectively and a second set of points of discrepancy in which first and second experts from among said plurality of experts output the second and first output values respectively.

17. A method according to claim 16 wherein said input comprises a quality assurance indication regarding a multiplicity of manufactured items.

18. A method according to claim 16 wherein said input comprises a determination of relevancy of a multiplicity of disclosed documents to a legal proceeding.

19. A method according to claim 16 wherein said input comprises a determination of relevancy of a multiplicity of disclosed documents to a search term entered into a search engine.

20. A method according to claim 16 wherein only said discrepancy set, and not said agreement set, is provided to the oracle.

21. A method according to claim 16 wherein said oracle comprises a computerized process which is more costly than the plurality of experts.

22. A method according to claim 16 wherein said selecting comprises using said oracle input and said input from the plurality of experts to estimate recall of an individual one of said plurality of experts.

23. A method according to claim 16 wherein said selecting comprises using said oracle input and said input from the plurality of experts to estimate precision of an individual one of said plurality of experts.

24. A method according to claim 16 wherein each of the expert-based processes has a binary output defining a first desired output value and a second undesired output value and also comprising using said oracle input and said input from the plurality of experts to estimate richness of the body of data including the proportion of the body of data having said first output value.

25. A method according to claim 16 wherein said portion of said discrepancy set comprises a random sample of each of said first and second sets.

26. A method according to claim 16 and also comprising receiving input from a plurality of experts operating a corresponding plurality of computerized expert-based processes on a body of data.

27. A method according to claim 26 wherein said body of data comprises a population of items each associated with a unique computer-readable ID.

28. A method according to claim 27 wherein each of said plurality of computerized expert-based processes comprises:
analyzing an individual item from among said population of items including determining a binary output representing said analyzing; and
generating a computerized representation of said binary output and associating said representation with said ID.

29. A method according to claim 16 and also comprising actuating said subset of better computerized expert-based processes for purposes of receiving input regarding a body of data.

* * * * *